(12) United States Patent
Martindale

(10) Patent No.: US 9,732,635 B2
(45) Date of Patent: Aug. 15, 2017

(54) METHOD FOR ENHANCED COLD STEAM TURBINE START IN A SUPPLEMENTARY FIRED MULTI GAS TURBINE COMBINED CYCLE PLANT

(71) Applicant: General Electric Company, Schenectady, NY (US)

(72) Inventor: Bruce Charles Martindale, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 327 days.

(21) Appl. No.: 14/699,224

(22) Filed: Apr. 29, 2015

(65) Prior Publication Data

US 2016/0319702 A1     Nov. 3, 2016

(51) Int. Cl.
| | |
|---|---|
| *F02C 1/00* | (2006.01) |
| *F01K 7/16* | (2006.01) |
| *F01K 23/10* | (2006.01) |
| *F02C 6/18* | (2006.01) |
| *F02C 3/04* | (2006.01) |
| *F01K 13/02* | (2006.01) |

(52) U.S. Cl.
CPC .............. *F01K 7/165* (2013.01); *F01K 13/02* (2013.01); *F01K 23/10* (2013.01); *F02C 3/04* (2013.01); *F02C 6/18* (2013.01); *F05D 2220/32* (2013.01); *F05D 2220/72* (2013.01); *F05D 2260/20* (2013.01); *F05D 2260/85* (2013.01); *Y02E 20/16* (2013.01)

(58) Field of Classification Search
CPC .......... F01K 13/02; F01K 23/10; F01K 7/165; F02C 3/04; F02C 6/18; F05D 2220/32; F05D 2220/72; F05D 2260/20; F05D 2260/85; Y02E 20/16

See application file for complete search history.

(56) References Cited

U.S. PATENT DOCUMENTS

| | | | |
|---|---|---|---|
| 3,879,616 A | 4/1975 | Baker et al. | |
| 7,621,133 B2 * | 11/2009 | Tomlinson | F01K 13/02 60/39.182 |

(Continued)

OTHER PUBLICATIONS

European Search Report and Written Opinion issued in connection with Corresponding EP Application No. 16167115.1 on Oct. 27, 2016.

*Primary Examiner* — Jesse Bogue
(74) *Attorney, Agent, or Firm* — Nixon & Vanderhye P.C.

(57) ABSTRACT

A method for enhanced cold (or warm) steam turbine start in a supplementary fired multi-gas turbine combined cycle plant is disclosed. Boiler supplementary firing, which is normally used to increase steam flow when the plant gas turbine is at maximum load, is used to augment steam production with a partly loaded, temperature matched gas turbine. This is done to satisfy minimum required steam flow for a cold (or warm) steam turbine start. Lighting the supplementary firing burners in the heat recovery steam generator/boiler and setting them at a minimum or low heat load serves to add enough steam, at the proper temperature, to insure a successful cold or warm steam turbine start when the gas turbine load and related steam production capacity from the gas turbine exhaust flow are limited by the need to match the required steam temperature and/or maintain low gas turbine exhaust emissions.

20 Claims, 1 Drawing Sheet

(56) References Cited

U.S. PATENT DOCUMENTS

| | | | |
|---|---|---|---|
| 2003/0131601 A1* | 7/2003 | Baxter | F01K 23/105 60/772 |
| 2003/0213246 A1* | 11/2003 | Coll | F01K 17/02 60/653 |
| 2010/0162721 A1 | 7/2010 | Welch et al. | |
| 2013/0047613 A1* | 2/2013 | Holt | F22B 1/1815 60/645 |
| 2014/0305132 A1 | 10/2014 | Gobrecht et al. | |
| 2015/0204214 A1* | 7/2015 | McDeed | F23R 3/40 60/772 |
| 2016/0281975 A1* | 9/2016 | Gasparini | F01K 7/18 |

* cited by examiner

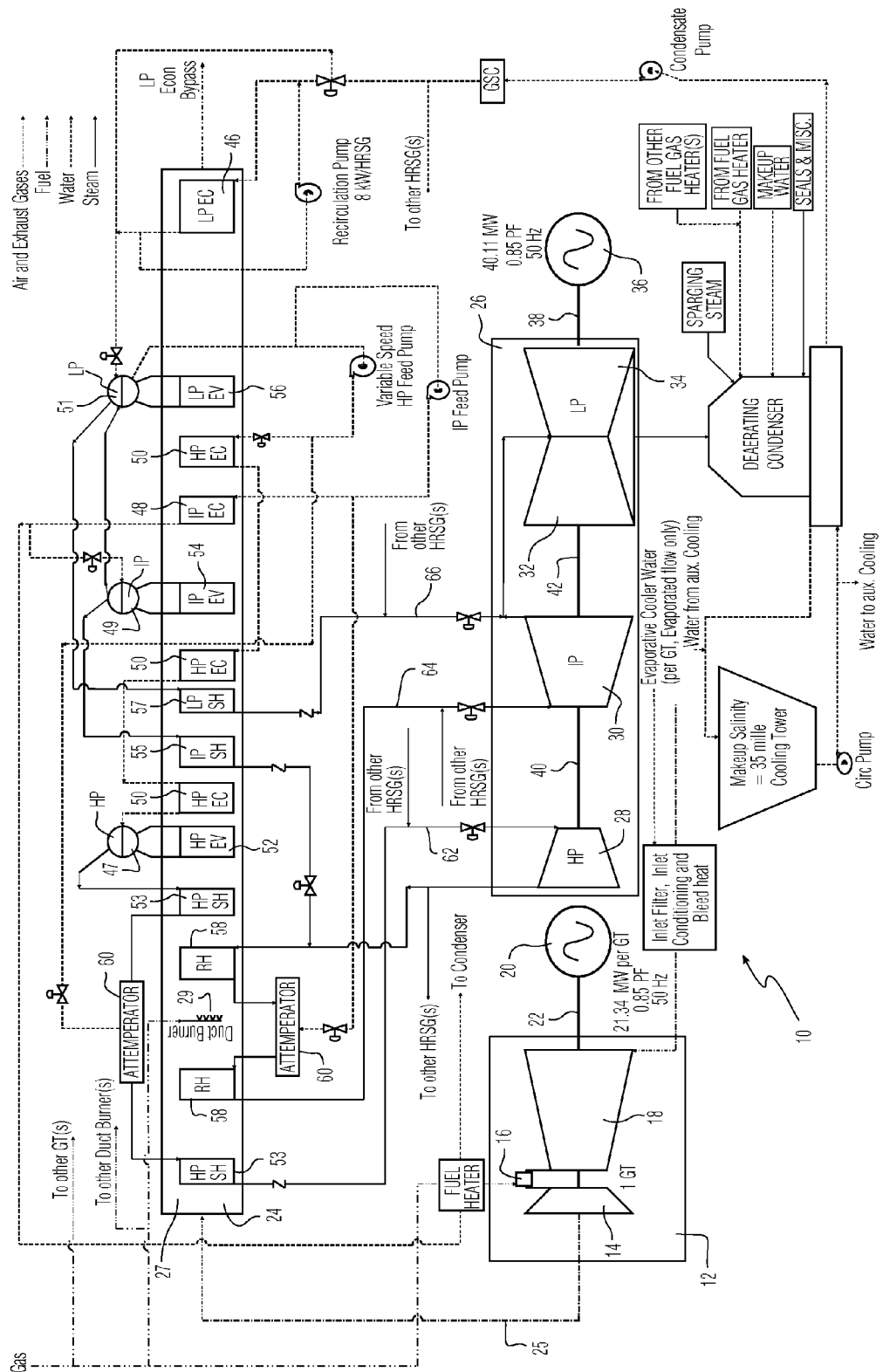

METHOD FOR ENHANCED COLD STEAM TURBINE START IN A SUPPLEMENTARY FIRED MULTI GAS TURBINE COMBINED CYCLE PLANT

The present invention relates to combined cycle power generating plants, and more particularly to a method for enhanced combined cycle plant startup of a cold steam turbine.

BACKGROUND OF THE INVENTION

In electric power generation, a combined cycle is an assembly of heat engines that work together using the same source of heat, converting the heat's thermal energy into mechanical energy, which, in turn, is used to drive one or more electric generators. In the combined cycle, after a working fluid completes its cycle in a first heat engine, the entropy of the working fluid is still low enough that a second, subsequent heat engine can also extract energy from the waste heat energy of the working fluid of the first heat engine. By combining these multiple streams of work upon mechanical shaft(s) turning electric generator(s), the overall net efficiency of such a system can be increased substantially.

In combined cycle power generating plants, a common combination is a Brayton cycle gas turbine (GT), whose hot exhaust powers a Rankine cycle steam turbine (ST) power plant that drives an electric generator. This is called a Combined Cycle Gas Turbine (CCGT) plant. In a combined cycle power plant, the heat of the gas turbine's exhaust is used to generate steam by passing it through a heat recovery steam generator (HRSG), which is an energy recovery heat exchanger that recovers heat from a hot gas stream. It produces steam that can be used to drive a steam turbine. HRSGs typically include the following components, i.e., an economizer, an evaporator, a reheater and a superheater. Additional steam turbine power can be obtained by increasing the overall steam flow with an additional supplementary fired or "duct" burner in the boiler.

Steam turbines in a multi-shaft combined cycle plant with supplementary firing can become very large due to the additional steam flow from the burner for each of the multiple HRSG units that are present. As such, these steam turbines can require a significantly larger minimum steam flow to successfully start the steam turbine and reach the minimum stable load. In some cases, the steam turbine rotor inertia is simply high due to the design requirements and this too can be difficult to start. A cold (or warm) steam turbine start requires lower temperature steam for stress control. Gas turbine units must therefore be parked at low loads to produce the required steam conditions; however, at low load steam, production is limited and may be insufficient for the steam turbine start up. In accordance with the present invention, supplementary firing of the boiler can be used to add the required steam flow while still maintaining equipment life and low emissions.

A steam turbine sized for (N) multiple, supplementary fired boilers must be able to start with steam from a single (or N−1) gas turbine due to plant operation and maintenance needs. A single gas turbine may not have the exhaust energy needed to produce the required steam flow for a cold steam turbine unit start. Hence, there may be difficulties in starting some steam turbine units in this fashion.

A two gas turbine plant can provide the required steam flow to cold start a steam turbine; however, a two gas turbine plant may not always have two gas turbines available to start a steam turbine, and hence the steam turbine can be prevented from running. Plant owners require the ability to start on a reduced number of gas turbines, i.e., N−1 (or more) gas turbine units, where N is the total number of gas turbine units. Starting capacity can be reduced by unit availability, maintenance needs, grid conditions, emissions limits or simply for an owner's convenience.

BRIEF SUMMARY OF THE INVENTION

The present invention relates to a method for enhanced cold or warm steam turbine start in a supplementary fired single or multi-gas turbine combined cycle plant.

In a first exemplary embodiment of the invention, a method for a cold or warm steam turbine start in a supplementary fired multi-gas turbine combined cycle plant including at least one gas turbine, a steam turbine, and at least one a heat recovery steam generator (HRSG) including at least one duct burner in the HRSG's inlet duct comprises starting and accelerating the gas turbine to full speed and then synchronizing the gas turbine to a load level that reduces gas turbine emissions to an approved emissions level, directing exhaust from the gas turbine to the HRSG to heat the HRSG so that the HRSG produces a steam flow, when the steam flow from the HRSG exceeds a flow level required to keep the HRSG at a predetermined pressure level, directing the excess steam flow to a waste heat sink and increasing gas turbine airflow at constant gas turbine load to thereby reduce gas turbine exhaust temperature so that steam flow temperature drops to a steam turbine metal temperature level, lighting and loading the duct burner when the steam flow temperature drops to the steam turbine metal temperature level, adjusting the steam flow to a predetermined increased flow level, a predetermined pressure level, and a predetermined reduced temperature level, and then admitting the steam flow to the steam turbine to start-up operation of the steam turbine, when the steam turbine start-up operation is complete, raising steam flow temperature to a predetermined increased temperature level by reducing gas turbine airflow at constant gas turbine load to a predetermined reduced flow level to thereby raise gas turbine exhaust temperature to a predetermined raised temperature level, loading the gas turbine by increasing fuel flow so that the steam flow reaches its rated temperature, when the steam flow reaches its rated temperature, shutting down the duct burners, loading the gas turbine to a final predetermined power production level, and when the gas turbine reaches the final predetermined power production level, re-lighting and loading the duct burner to increase steam flow to a final predetermined power production level and thereby steam turbine power level, whereby the cold or warm steam turbine start will occur when the gas turbine load level and hence related HRSG steam production capacity are limited in satisfying the steam flow and temperature required for the steam turbine start.

In another exemplary embodiment of the invention, a method for an enhanced cold or warm steam turbine start in a supplementary fired multi-gas turbine combined cycle plant including a plurality of gas turbines, a steam turbine, and at least one a heat recovery steam generator (HRSG) including at least one duct burner in the HRSG's inlet duct and at least one steam drum comprises starting and accelerating the gas turbine to full speed and then synchronizing the gas turbine to a load level that reduces gas turbine emissions to an approved emissions level, directing exhaust from the gas turbine to the HRSG to heat the HRSG so that the HRSG produces a steam flow, when the steam flow from the HRSG exceeds a flow level required to keep the HRSG at a predetermined pressure level, directing the excess steam flow to a condenser and increasing gas turbine airflow at constant gas turbine load to thereby reduce gas turbine exhaust temperature so that steam flow temperature drops to a steam turbine metal temperature level, lighting and loading the duct burner when the steam flow temperature drops to the steam turbine metal temperature level, adjusting at least one of steam drum pressure and duct burner fuel input to adjust steam flow to a predetermined increased flow level, a predetermined pressure level, and a predetermined reduced temperature level, and then admitting the steam flow to the steam turbine to start-up operation of the steam turbine, when the steam turbine start-up operation is complete, raising steam flow temperature to a predetermined increased temperature level by reducing gas turbine airflow at constant gas turbine load to a predetermined reduced flow level to thereby raise gas turbine exhaust temperature to a predetermined raised temperature level, returning the gas turbine to a normal operation and loading the gas turbine by increasing fuel flow so that the steam flow reaches its rated temperature, when the steam flow reaches its rated temperature, shutting down the duct burners, loading the gas turbine to a final predetermined power production level, and when the gas turbine reaches the predetermined power production level, re-lighting and loading the duct burner to increase steam flow and thereby overall steam turbine power level, whereby the cold or warm steam turbine start will occur when the gas turbine load level and hence related HRSG steam production capacity are limited in satisfying the steam flow and temperature required for the steam turbine start.

In a further exemplary embodiment of the invention, a method for an enhanced cold or warm steam turbine start in a supplementary fired multi-gas turbine combined cycle plant including a predetermined number N of gas turbines, a steam turbine driving an electric generator, and at least one a heat recovery steam generator (HRSG) including at least one inlet burner in the HRSG's inlet duct comprises firing and accelerating at least one of the N gas turbines to full speed and then synchronizing the gas turbine to a load level that reduces gas turbine emissions to an approved emissions level, directing exhaust from the gas turbine to the HRSG to warm up the HRSG so that the HRSG starts producing steam flow, when the steam flow from the HRSG exceeds a flow level required to keep the HRSG at a predetermined pressure level, directing the excess steam flow to a waste heat sink and increasing gas turbine airflow at constant gas turbine load to thereby reduce gas turbine exhaust temperature so that steam flow temperature drops to a steam turbine metal temperature level, lighting and loading the duct burner when the steam flow temperature drops to the steam turbine metal temperature level, when the steam flow from the HRSG exceeds a flow level required to keep the HRSG at a predetermined pressure level, directing the excess steam flow to a waste heat sink and increasing gas turbine airflow at constant gas turbine load to thereby reduce gas turbine exhaust temperature so that steam flow temperature drops to a steam turbine metal temperature level, adjusting drum pressure settings and burner fuel input to adjust the steam flow to a predetermined increased flow level, a predetermined pressure level, and a predetermined reduced temperature level, and then admitting the steam flow to the intermediate pressure section of the steam turbine to begin the start-up operation of the steam turbine, when the steam turbine accelerates so as to synchronize to a power grid to which the generator is attached and establishes a minimum breaker closure load, admitting steam flow to a high pressure section of the steam turbine, thereafter, admitting steam flow to a low pressure section of the steam turbine to complete the steam turbine start-up operation, when the steam turbine start-up operation is complete, raising steam flow temperature to a predetermined increased temperature level by reducing gas turbine airflow at constant gas turbine load to a predetermined reduced flow level to thereby raise gas turbine exhaust temperature to a predetermined raised temperature level, returning the gas turbine to a normal operating control curve and loading the gas turbine by increasing fuel flow so that the steam flow reaches its rated temperature, when the steam flow reaches its rated temperature, tripping the duct burners, loading the gas turbine to a final predetermined power production level, such that the steam turbine load follows as higher exhaust gas heat from the gas turbine produces more steam, and when the gas turbine reaches full load, re-lighting and loading the duct burners to increase overall steam turbine power levels, whereby the cold or warm steam turbine start will occur when the gas turbine load level and hence related HRSG steam production capacity are limited in satisfying the steam flow and temperature required for the steam turbine start.

BRIEF DESCRIPTION OF THE DRAWINGS

FIG. 1 is a schematic drawing of a Combined Cycle Gas Turbine (CCGT) power plant, in which the hot exhaust of a gas turbine (GT) burning natural gas or synthesis gas from coal, produces steam to power a steam turbine (ST) power plant.

DETAILED DESCRIPTION OF THE INVENTION

The present invention relates to a method for enhanced cold steam turbine start in a supplementary fired multi-gas turbine combined cycle plant.

Boiler supplementary firing (normally used to increase steam flow when the gas turbine is at maximum load) is now to be used to augment steam production with a partly loaded, temperature matched gas turbine. This is done to satisfy minimum required flow for a cold steam turbine start.

Boiler supplementary firing (SF), normally used to increase steam flow with a gas turbine at high load, is used to augment steam production with a low load, temperature matched gas turbine. This is done to satisfy minimum required flow for a cold steam turbine start with a reduced number of gas turbine units in start-up mode. Steam turbine units in plants with supplementary firing can be hard to start.

Lighting the supplementary firing burners in the boiler and setting them at a minimum or low heat load serves to add enough steam, at the proper temperature, to insure a successful cold or warm steam turbine start when the gas turbine load is limited to match the required steam temperature. The method of the present invention avoids having to fire all gas turbine units in the plant just to get the steam turbine started. The method of the present invention also permits significantly lower stack emissions compared to a higher loaded gas turbine. Note that a higher load gas turbine required for steam flow may not also be able to match steam temperature and may exceed the specific customer's environmental emissions permits.

The method of the present invention is used specifically for a cold (or warm) steam turbine start, in contrast to the typical intent to supplement process flow and or for maximum steam turbine power at full gas turbine load. The method of the present invention also creatively uses existing plant equipment at no further cost or impact but has a significantly lower start up emissions for cycling plant use. The method assures successful steam turbine starts with a reduced number of gas turbine units. The method does not add significantly to stack emissions, whereas a higher gas turbine load would have an order of magnitude increase in carbon monoxide (CO). Thus, it permits plant operators to meet stricter startup emissions permits because the method has significantly lower stack emissions compared to use of a higher gas turbine load or use of two gas turbines to start the steam turbine.

As noted above, FIG. 1 is a schematic drawing of a Combined Cycle Gas Turbine (CCGT) power plant 10, in which the hot exhaust from a gas turbine 12 burning natural gas or synthesis gas from coal, powers a steam turbine power plant. This "gas burner" (gas turbine 12) includes a compressor 18, a combustor 16, and combustion turbine 14, which drives an electric generator 20 by means of a mechanical shaft 22 rotated by the combustion turbine 18.

Heat from the gas turbine's exhaust gas 25 is used to generate steam by passing it through a heat recovery steam generator (HRSG) 24, which is an energy recovery heat exchanger that recovers waste heat available in the gas turbine exhaust gas 25. This "large boiler" (HRSG 24) is filled with heat exchanger surfaces so that it can use the recovered waste heat from exhaust gas 25 to generate steam at high pressure and high temperature. This steam is then used in a steam turbine/generator power plant 26 shown in FIG. 1 to produce rotational mechanical energy in the steam turbine to drive and electric generator.

The steam turbine 26 used in power plant 10 includes three separate turbine modules operating at different pressure and temperature levels. These turbines modules include a high pressure (HP) turbine module 28, an intermediate pressure (IP) turbine module 30 coupled to the high pressure turbine module 28 by means of a mechanical shaft 40, and two low pressure (LP) turbines modules 32 and 34. The next to last low pressure turbine module 32 is coupled to the intermediate pressure turbine module 30 by means of a second mechanical shaft 42. The last low pressure turbine module 34 is then directly coupled to an electric generator 36 by means of a third mechanical shaft 38 which rotates the electric generator 36 which then produces electric power.

The exhaust gas 25 discharged from the end of the gas turbine 12 passes through various components in the HRSG 24 and escapes to atmosphere through a stack (not shown). The gas turbine 12 exhaust gas 25 is directed to the HRSG 24 components by the inlet duct 27 of the HRSG 24.

The HRSG 24 shown in FIG. 1 is a multi-pressure HRSG employing three (triple pressure) steam drums. As such, the triple pressure HRSG 24 consists of three sections, i.e., a low pressure (LP) section, a reheat/intermediate pressure (IP) section, and a high pressure (HP) section. Each section has a steam drum and an evaporator section where water is converted to steam. This steam then passes through superheaters and/or reheaters to raise the temperature of the steam. Thus, the HRSG 24 includes a series of economizers (preheaters, EC), evaporators (EV), reheaters (RH) and superheaters (SH) in the three pressure sections described below. The HRSG 24 also has supplemental firing in the duct 27 in the form of a duct burner 29 that raises gas temperature and mass flow. The exhaust gas 25 flows across the duct burner 29, which is located typically between the high pressure superheater and reheater sections 53 and 58.

The low, reheat/intermediate and high pressure sections of the HRSG 24 together include high pressure 50, intermediate pressure 48, and low pressure 46 economizers, whose function is to increase water temperature to produce steam. These sections of the HRSG 24 also include high pressure 47, intermediate pressure 49, and low pressure 51 steam drums, which function as steam/water separators, storage tanks and water treatment sites for steam purity control. These sections further include high pressure 52, intermediate pressure 54, and low pressure 56 evaporator sections, which is where the boiling process or steam generation occurs. As heat energy from the exhaust gas stream is absorbed by water, the water temperature increases. When water reaches its boiling point or saturation temperature, some of the water evaporates or vaporizes to steam. The steam is generated at a saturation temperature associated with operating pressure.

Finally, the low, reheat/intermediate and high pressure sections of the HRSG 24 includes high pressure 53, intermediate pressure 55, and low pressure 57 superheater sections, and the reheat/intermediate pressure section also includes reheaters 58, whose function is to increase steam temperature. High steam temperature minimizes the introduction of water as liquid to the steam turbine and improves steam cycle efficiency. The superheaters and reheaters absorb heat energy from the exhaust gas 25 from the gas turbine 12 and transfer this energy to the steam from the evaporator sections 52, 54 and 56. The steam superheat energy level is measured as an increase in steam temperature beyond the steam temperature achieved in the evaporator sections. The high pressure superheaters 53 heat the steam from a temperature of ~650° F. to 1,050° F. to generate the steam 62 that is feed to the high pressure steam turbine 28. The high pressure superheater 53 and the reheaters 58 are also equipped with attemperators 60 whose function is final steam temperature control to prevent possible thermal damage to piping and downstream equipment, such as the steam turbines 28, 30, 32 and 34.

Typically, the steam turbine 26 is large so that it can be used with a generator 36 that s large enough to meet the often large summer demand for electricity. Typically, there are two or more gas burners, like gas turbine 12, that are present in a Combined Cycle Gas Turbine power plant 10 to produce exhaust gas from which waste heat can be recovered that is used to generate enough steam to rotate a large steam turbine, such as steam turbine 26. Steam turbine units in plants with supplementary firing can be hard to start. As noted above, a two gas burner plant may not always have two gas turbines available to start a large steam turbine, and hence the steam turbine can be prevented from running.

Thus, the present invention relates to a method for enhanced cold steam turbine start in a supplementary fired multi-gas turbine combined cycle plant. According to the method of the present invention, boiler supplementary firing (SF), which normally used to increase steam flow with a gas turbine at high load, is used to augment steam production in the HRSG 24 with a low load, temperature matched gas turbine 12. This is done to satisfy minimum required steam flow for a cold steam turbine start with a reduced number of gas turbine units in start-up mode. The boiler supplementary firing is accomplished using the duct burner 29.

Lighting the supplementary firing burners 29 in the HRSG boiler 24 and setting them at a minimum or low heat load serves to add enough steam, at the proper temperature, to insure a successful cold or warm steam turbine start when the gas turbine load is limited to match the required steam temperature.

The method of the present invention avoids having to fire all gas turbine units in the plant just to get the steam turbine started. The method of the present invention also permits significantly lower stack emissions compared to a higher loaded gas turbine. Note that a higher load gas turbine required for steam flow may not also be able to match steam temperature.

The method of the present invention is used specifically for a cold (or warm) steam turbine starts, in contrast to supplementing process flow, or for maximum steam turbine power at full gas turbine load. The method of the present invention also creatively uses existing plant equipment at no further cost or impact but has a significantly lower start up emissions for cycling plant use. The method assures successful steam turbine starts with a reduced number of gas turbine units. The method does not add significantly to stack emissions, whereas a higher gas turbine load would have an order of magnitude increase in carbon monoxide (CO). Thus, it permits plant operators to meet stricter startup emissions permits because the method has significantly lower stack emissions compared to use of a higher gas turbine load or use of two gas turbines to start the steam turbine.

Operation and use of the plant 10 according to the method of the present invention is as follows. The plant 10 start pre-requisites, such as drum level and pumps started, are satisfied in the normal fashion. The gas turbine 12 is fired and accelerated to full speed and synchronized to a load under ~30 MW in order to minimize environmental emissions. Raising the gas turbine 12 load any further could produce higher carbon monoxide levels. The gas turbine exhaust 25 warms up the boiler/HRSG 24 and any steam produced by the HRSG 24 pressurizes and warms the plant steam piping systems. Any steam flow in excess of that needed to maintain the boiler pressure set points, is diverted to a condenser (waste heat sink) via a steam bypass system. This steam is not suitable for steam turbine use at this time because the temperature may be too high, and flow too low to start the steam turbine 26. At this point, the plant controller initiates a change to the gas turbine airflow (increase) to reduce the gas turbine exhaust temperature at constant gas turbine load. This is done to meet the required steam turbine metal temperature matching signal. The steam temperature will drop. It will now meet required temperature, but the flow is still too low for a full steam turbine start; the flow is all diverted to the condenser. Given that the steam turbine 26 is cold, and gas turbine power under 30 MW, the duct burner 29 start permissives are satisfied and the pilots and main burners the duct burner 29 are now lit. Steam temperature may increase initially, but heat reaching the downstream evaporator section will produce more steam flow, which then reduces the temperature. Drum pressure settings and burner fuel input can be used to adjust the system performance. With proper steam conditions present (increased flow, proper pressure, and reduced temperature), the intermediate pressure turbine control valves are opened to start the steam turbine 26. The bypass system valves close slightly to maintain system pressure. The steam turbine 26 accelerates, synchronizes to the power grid, and establishes a minimum breaker closure load. Flow is now admitted to the high pressure section to complete the startup. The steam temperature is still suppressed for the startup. With all turbine sections receiving steam flow, the steam temperature may now be raised by reducing the gas turbine airflow at constant gas turbine load (this is the exit path from temperature matching). The gas turbine exhaust temperature 25 is raised at a rate acceptable to the steam turbine controller. The gas turbine returns to the normal operating control curve. Loading of the gas turbine 12, by increasing fuel flow, will now allow steam to reach rated temperature. The duct burners 29 have been held at constant load during this period. Protective systems watch for excessive system temperatures. When the steam reaches rated temperature, the burners 29 can be tripped. The gas turbine 12 is now loaded to final desired power production level. Steam turbine load will follow as the higher exhaust heat produces more steam. When the gas turbine 12 reaches full load, the duct burners 29 may now be re-lit and loaded to increase overall steam turbine power levels. To reduce steam turbine power, the burners are unloaded and shutdown prior to unloading the gas turbine 12 from full load. Protective systems hold the gas valves from further opening should a high temperature alarm appear. A Hi-Hi (two (2) Hi) temperature alarm will reduce the burner gas flow to minimum, and a Hi-Hi-Hi (three (3) Hi) temperature alarm will trip it. Unloading the gas turbine 12 with the burners on will trip them.

It should be noted that the method of the present invention produces increased high pressure and hot reheat steam flows that are then available to cold start the steam turbine. The result is increased steam turbine power that can be in the order of 5 MW, while the gas turbine power remains unchanged. The method of the present invention insures a successful cold or warm steam turbine start when the gas turbine load (and hence its related steam production capacity) is limited to match the required steam temperature.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for a cold or warm steam turbine start in a supplementary fired single or multi-gas turbine combined cycle plant including at least one gas turbine, a steam turbine, and at least one a heat recovery steam generator (HRSG) including at least one duct burner in at least one HRSG inlet duct, the method comprising:

starting and accelerating the gas turbine to full speed and then synchronizing the gas turbine to a load level that reduces gas turbine emissions to an approved emissions level, directing exhaust from the gas turbine to the HRSG to heat the HRSG so that the HRSG produces a steam flow, when the steam flow from the HRSG exceeds a flow level required to keep the HRSG at a predetermined pressure level, directing the excess steam flow to a waste heat sink and increasing gas turbine airflow at constant gas turbine load to thereby reduce gas turbine exhaust temperature so that steam flow temperature drops to a steam turbine metal temperature level, lighting and loading the duct burner when the steam flow temperature drops to the steam turbine metal temperature level, adjusting the steam flow to a predetermined increased flow level, a predetermined pressure level, and a predetermined reduced temperature level, and then admitting the steam flow to the steam turbine to start-up operation of the steam turbine, when the steam turbine start-up operation is complete, raising steam flow temperature to a predetermined increased temperature level by reducing gas turbine airflow at constant gas turbine load to a predetermined reduced flow level to thereby raise gas turbine exhaust temperature to a predetermined raised temperature level, loading the gas turbine by increasing fuel flow so that the steam flow reaches its rated temperature, when the steam flow reaches its rated temperature, shutting down the duct burners, loading the gas turbine to a final predetermined power production level, and when the gas turbine reaches the final predetermined power production level, re-lighting and loading the duct burner to increase steam flow to a final predetermined power production level and thereby steam turbine power level, whereby the cold or warm steam turbine start will occur when the gas turbine load level and hence related HRSG steam production capacity are limited in satisfying the steam flow and temperature required for the steam turbine start.

2. The method of claim 1, wherein the at least one gas turbine comprises a plurality of gas turbines, and wherein only one of the plurality of gas turbines is used in the cold steam turbine start.

3. The method of claim 1, wherein the at least one gas turbine comprises N gas turbines, and wherein N−1 of the N gas turbines is/are used in the cold steam turbine start.

4. The method of claim 1, wherein the waste heat sink is a condenser.

5. The method of claim 1, wherein the gas turbine is returned to a normal operation in connection with the gas turbine being loaded by increasing fuel flow so that the steam flow reaches its rated temperature.

6. The method of claim 1, wherein the steam turbine includes a plurality of separate turbine modules operating at a plurality of different pressure and temperature levels.

7. The method of claim 1, wherein the steam turbine includes a high pressure (HP) turbine module, an intermediate pressure (IP) turbine module coupled to the high pressure turbine module, and two low pressure (LP) turbines modules, a first low pressure turbine module being coupled to the intermediate pressure turbine module and a second low pressure turbine module being coupled to a generator.

8. The method of claim 1, wherein the two low pressure turbines modules include a first low pressure turbine module coupled to the intermediate pressure turbine module by means of a second mechanical shaft, and a second low pressure turbine module that is directly coupled to an electric generator by means of a third mechanical shaft which rotates the electric generator to produces electric power.

9. The method of claim 1, wherein the HRSG is comprised of a low pressure (LP) section, a reheat/intermediate pressure (IP) section, and a high pressure (HP) section.

10. The method of claim 1, wherein the at least one HRSG is a plurality of HRSGs, each including at least one duct burner in the HRSG's inlet duct.

11. The method of claim 1, wherein the at least one duct burner in the HRSG's inlet duct is a plurality of duct burners in the HRSG's inlet duct.

12. The method of claim 1, wherein the HRSG also includes at least one steam drum, and wherein at least one of steam drum pressure and duct burner fuel input is/are adjusted to adjust the steam flow to the predetermined increased flow level, the predetermined pressure level, and the predetermined reduced temperature level.

13. A method for an enhanced cold or warm steam turbine start in a supplementary fired multi-gas turbine combined cycle plant including a plurality of gas turbines, a steam turbine, and at least one a heat recovery steam generator (HRSG) including at least one duct burner in at least one HRSG inlet duct and at least one steam drum, the method comprising:

starting and accelerating the gas turbine to full speed and then synchronizing the gas turbine to a load level that reduces gas turbine emissions to an approved emissions level, directing exhaust from the gas turbine to the HRSG to heat the HRSG so that the HRSG produces a steam flow, when the steam flow from the HRSG exceeds a flow level required to keep the HRSG at a predetermined pressure level, directing the excess steam flow to a condenser and increasing gas turbine airflow at constant gas turbine load to thereby reduce gas turbine exhaust temperature so that steam flow temperature drops to a steam turbine metal temperature level, lighting and loading the duct burner when the steam flow temperature drops to the steam turbine metal temperature level, adjusting at least one of steam drum pressure and duct burner fuel input to adjust steam flow to a predetermined increased flow level, a predetermined pressure level, and a predetermined reduced temperature level, and then admitting the steam flow to the steam turbine to start-up operation of the steam turbine, when the steam turbine start-up operation is complete, raising steam flow temperature to a predetermined increased temperature level by reducing gas turbine airflow at constant gas turbine load to a predetermined reduced flow level to thereby raise gas turbine exhaust temperature to a predetermined raised temperature level, returning the gas turbine to a normal operation and loading the gas turbine by increasing fuel flow so that the steam flow reaches its rated temperature, when the steam flow reaches its rated temperature, shutting down the duct burners, loading the gas turbine to a final predetermined power production level, and when the gas turbine reaches the predetermined power production level, re-lighting and loading the duct burner to increase steam flow and thereby overall steam turbine power level, whereby the cold or warm steam turbine start will occur when the gas turbine load level and hence related HRSG steam production capacity are limited in satisfying the steam flow and temperature required for the steam turbine start.

14. The method of claim 13, wherein the plurality of gas turbines comprise N gas turbines, and wherein N−1 of the N gas turbines is/are used in the cold steam turbine start.

15. The method of claim 13, wherein the gas turbine is returned to a normal operation in connection with the gas turbine being loaded by increasing fuel flow so that the steam flow reaches its rated temperature.

16. The method of claim 13, wherein the steam turbine includes a plurality of separate turbine modules operating at a plurality of different pressure and temperature levels.

17. The method of claim 13, wherein the two low pressure turbines modules include a first low pressure turbine module coupled to the intermediate pressure turbine module by means of a second mechanical shaft, and a second low pressure turbine module that is directly coupled to an electric generator by means of a third mechanical shaft which rotates the electric generator to produces electric power.

18. The method of claim 13, wherein the HRSG is comprised of a low pressure (LP) section, a reheat/intermediate pressure (IP) section, and a high pressure (HP) section.

19. The method of claim 13, wherein the steam turbine start-up operation is complete when the steam flows to each of the plurality of separate turbine modules operating at the plurality of different pressure and temperature levels.

20. A method for an enhanced cold or warm steam turbine start in a supplementary fired multi-gas turbine combined cycle plant including a predetermined number N of gas turbines, a steam turbine driving an electric generator, and at least one a heat recovery steam generator (HRSG) including at least one inlet burner in at least one HRSG inlet duct, the method comprising:

firing and accelerating at least one of the N gas turbines to full speed and then synchronizing the gas turbine to a load level that reduces gas turbine emissions to an approved emissions level, directing exhaust from the gas turbine to the HRSG to warm up the HRSG so that the HRSG starts producing steam flow, when the steam flow from the HRSG exceeds a flow level required to keep the HRSG at a predetermined pressure level, directing the excess steam flow to a waste heat sink and increasing gas turbine airflow at constant gas turbine load to thereby reduce gas turbine exhaust temperature so that steam flow temperature drops to a steam turbine metal temperature level, lighting and loading the duct burner when the steam flow temperature drops to the steam turbine metal temperature level, when the steam flow from the HRSG exceeds a flow level required to keep the HRSG at a predetermined pressure level, directing the excess steam flow to a waste heat sink and increasing gas turbine airflow at constant gas turbine load to thereby reduce gas turbine exhaust temperature so that steam flow temperature drops to a steam turbine metal temperature level, adjusting drum pressure settings and burner fuel input to adjust the steam flow to a predetermined increased flow level, a predetermined pressure level, and a predetermined reduced temperature level, and then admitting the steam flow to the intermediate pressure section of the steam turbine to begin the start-up operation of the steam turbine, when the steam turbine accelerates so as to synchronize to a power grid to which the generator is attached and establishes a minimum breaker closure load, admitting steam flow to a high pressure section of the steam turbine, thereafter, admitting steam flow to a low pressure section of the steam turbine to complete the steam turbine start-up operation, when the steam turbine start-up operation is complete, raising steam flow temperature to a predetermined increased temperature level by reducing gas turbine airflow at constant gas turbine load to a predetermined reduced flow level to thereby raise gas turbine exhaust temperature to a predetermined raised temperature level, returning the gas turbine to a normal operating control curve and loading the gas turbine by increasing fuel flow so that the steam flow reaches its rated temperature, when the steam flow reaches its rated temperature, tripping the duct burners, loading the gas turbine to a final predetermined power production level, such that the steam turbine load follows as higher exhaust gas heat from the gas turbine produces more steam, and when the gas turbine reaches full load, re-lighting and loading the duct burners to increase overall steam turbine power levels, whereby the cold or warm steam turbine start will occur when the gas turbine load level and hence related HRSG steam production capacity are limited in satisfying the steam flow and temperature required for the steam turbine start.

\* \* \* \* \*

UNITED STATES PATENT AND TRADEMARK OFFICE
CERTIFICATE OF CORRECTION

Page 1 of 1

PATENT NO. : 9,732,635 B2
APPLICATION NO. : 14/699224
DATED : August 15, 2017
INVENTOR(S) : Bruce Martindale It is certified that error appears in the above-identified patent and that said Letters Patent is hereby corrected as shown below:

In the Specification

Column 6, Line 36, change "s" to --is--

Signed and Sealed this
Twenty-sixth Day of September, 2017

Joseph Matal
*Performing the Functions and Duties of the
Under Secretary of Commerce for Intellectual Property and
Director of the United States Patent and Trademark Office*